United States Patent

Mitchell

[11] Patent Number: 5,811,164
[45] Date of Patent: Sep. 22, 1998

[54] AERATION PIPE AND METHOD OF MAKING SAME

[75] Inventor: William S. Mitchell, McKenzie, Tenn.

[73] Assignee: Plastic Specialties and Technologies Investments, Inc., Ridgefield, N.J.

[21] Appl. No.: 720,078

[22] Filed: Sep. 27, 1996

[51] Int. Cl.[6] .............................. B29C 47/92; B32B 5/18
[52] U.S. Cl. ..................... 428/36.5; 138/118; 239/145; 264/40.4; 264/40.7; 264/41; 264/209.6; 405/45; 428/36.9; 428/36.92
[58] Field of Search .................... 264/41, 45.3, 45.9, 264/209.6, 40.4, 40.7; 405/45; 239/145; 428/36.5, 36.9, 36.92; 138/118

[56] References Cited

U.S. PATENT DOCUMENTS

| | | | |
|---|---|---|---|
| 2,423,260 | 7/1947 | Slaughter | 18/14 |
| 2,477,170 | 7/1949 | Broderson et al. | 264/75 |
| 2,708,772 | 5/1955 | Moncrieff | 18/14 |
| 3,624,025 | 11/1971 | Twist | 264/40.4 |
| 3,880,965 | 4/1975 | Dudis et al. | 261/122 |
| 4,003,408 | 1/1977 | Turner | 138/118 |
| 4,012,348 | 3/1977 | Chelland et al. | 264/40.7 |
| 4,078,113 | 3/1978 | Starbuck et al. | 156/244.24 |
| 4,110,420 | 8/1978 | Turner | 264/41 |
| 4,168,799 | 9/1979 | Turner | 239/145 |
| 4,244,897 | 1/1981 | Moon | 264/40.4 |
| 4,422,991 | 12/1983 | Phillips | 264/83 |
| 4,498,783 | 2/1985 | Rudolph | 366/132 |
| 4,501,498 | 2/1985 | McKelvey | 366/69 |
| 4,517,316 | 5/1985 | Mason | 521/81 |
| 4,544,279 | 10/1985 | Rudolph | 366/132 |
| 4,551,289 | 11/1985 | Schwab et al. | 264/40.4 |
| 4,581,137 | 4/1986 | Edwards | 210/220 |
| 4,615,642 | 10/1986 | Mason | 405/42 |
| 4,616,055 | 10/1986 | Mason | 524/381 |
| 4,622,139 | 11/1986 | Brown | 210/170 |
| 4,684,488 | 8/1987 | Rudolph | 264/40.4 |
| 4,776,127 | 10/1988 | Jackson | 43/57 |
| 4,923,659 | 5/1990 | Kunz | 264/85 |
| 4,931,236 | 6/1990 | Hettinga | 264/41 |
| 4,938,605 | 7/1990 | Freidrich | 366/76 |
| 4,958,770 | 9/1990 | Mitchell | 239/145 |
| 5,034,164 | 7/1991 | Semmens | 261/122 |
| 5,063,018 | 11/1991 | Fontirroche | 264/514 |
| 5,075,048 | 12/1991 | Veeder | 261/122 |
| 5,114,648 | 5/1992 | Kuc, Sr. | 264/134 |
| 5,262,096 | 11/1993 | Egashira | 261/122.1 |
| 5,330,688 | 7/1994 | Downs | 261/122.2 |
| 5,334,336 | 8/1994 | Franz et al. | 264/45.3 |
| 5,352,610 | 10/1994 | Braeutigam | 435/284 |
| 5,376,311 | 12/1994 | DeGuzman | 261/77 |
| 5,391,334 | 2/1995 | Enomoto | 264/40.7 |
| 5,422,043 | 6/1995 | Burris | 261/122.1 |
| 5,426,092 | 6/1995 | Franz et al. | 138/177 |
| 5,445,775 | 8/1995 | Prassas et al. | 264/41 |
| 5,453,229 | 9/1995 | Enomoto | 264/40.7 |

FOREIGN PATENT DOCUMENTS

WO 90/12680  11/1990  WIPO ................................ 428/36.5

*Primary Examiner*—Leo B. Tentoni
*Attorney, Agent, or Firm*—Wood,Herron & Evans ,L.L.P.

[57] ABSTRACT

This invention relates to the manufacture of flexible porous plastic aeration pipe having an essentially uniform porosity throughout its length. The plastic pipe of this invention has a gas permeable wall of thermoset polymer particles and thermoplastic binder for the particles with a substantially uniform plurality of micropores through the wall of about 0.001 inch to 0.004 inch along its length for diffusion of gas therethrough and transfer to a medium. The thermoset polymer particles have a mesh size of about 60 to about 140 mesh, preferably approximately 80 to 100 mesh. The method of manufacture includes volumetric delivery of thermoset polymer particles and thermoplastic binder particles to a mixing chamber for preblending and then controlled volumetric feeding of the preblend into an extruder to form the porous aeration pipe.

17 Claims, 4 Drawing Sheets

AERATION PIPE AND METHOD OF MAKING SAME

This application is related to applications Ser. Nos. 08/722,505 and 08/722,506, filed contemporaneously with the instant application, and entitled, "Gas Injection Process for Producing Porous Plastic Pipe" and "Method of Blending Components for Porous Plastic Pipe Processing", which are incorporated herein in their entireties by reference.

FIELD OF THE INVENTION

This invention relates to the production of flexible porous plastic aeration pipe, having a substantially uniform porosity throughout the length of the pipe.

BACKGROUND OF THE INVENTION

Heretofore, ceramic dome diffusers have been used to transfer oxygen to various mediums in a wide array of aeration treatment applications such as sewage treatment and water purification, aquaculture, and in some circumstances agriculture and subsurface air or nitrogen injection. However, it has been found that dome diffusers are difficult to maintain, lack durability, and are more costly to manufacture in mass production.

Porous rubber hoses have been used for aeration. However, a key objection to off-the-shelf porous rubber hoses and other porous rubber aeration products is that, after a cure period in water, the hose requires high air pressure delivery systems because the rubber particles unsatisfactorily swell in water thereby decreasing pore diameter. Decreasing pore diameter causes increased flow resistance and uneven aeration patterns in long runs of tubing become more problematic as the pipes age in their environment. Further problems associated with the manufacture of porous aeration pipe utilizing previous methods have included irregularly shaped pipe walls, inconsistent porosity, and ineffective micropore size and wall thickness producing inconsistent and unreliable aeration rates.

Therefore, improvements in the manufacture of porous aeration pipe are still needed. In particular, there exists a need for a porous aeration pipe and a process for making such pipe that controls pipe composition, including component particle size, blending of the composition components, extrusion rates and pulling rates to provide consistent diffusion rates for pipes. Also, additional improvements in extrusion processes making porous pipe are needed to limit mechanical wear on the extruder apparatus during manufacture while maintaining a more uniform and consistent porosity along the entire length of a pipe without effecting pipe shape and efficient extrusion rates.

SUMMARY OF THE INVENTION

The present invention relates to a porous plastic aeration pipe for improved diffusion of gas into a medium and process for making it. The pipe has a gas permeable wall of thermoset polymer particles and thermoplastic binder for the particles with a plurality of micropores through the wall of about 0.001 inch to about 0.004 inch average diameter along its length for diffusion of gas through the wall and transfer to a medium. The micropores provide a substantially uniform porosity through the pipe wall along its length. The thermoset polymer particles have a mesh size of about 60 to about 140 mesh, preferably about 80 to 1.00 mesh.

The particle mesh size and micropores are important in order to achieve the improved diffusion of gas in accordance with the principles of this invention. Above about 140 mesh particles and below about 0.001 inch average diameter of micropores, there is limited gas or oxygen transfer and the porous pipe is cost ineffective. Below about 60 mesh particles and above 0.004 inch average dimension of micropores, there is also limited gas or oxygen transfer and the porous pipe is cost ineffective. Where gas bubbles tend to be too big in water, for example, more cfm of gas needs to be pumped to get the same results.

The improved aeration pipe and process for making it have overcome or aleviated the aforementioned problems in the above background of this invention. The present invention provides a product with a uniform porosity that yields good air flow at low pressures. Additionally, besides being as efficient, the improved aeration pipe is less expensive, more durable and cheaper to operate than currently available dome, stone and cylinder aeration devices.

Generally, the process for making the porous plastic aeration pipe comprises extruding a plastic composition of thermoset polymer particles and a thermoplastic binder for the particles at an elevated temperature through a die to form a softened pipe-preform. Gas may be injected under positive pressure into the inside of the softened pipe-preform during extrusion and cooling to produce a porous pipe of substantially constant size and shape having a fluid permeable wall along its length. The gas may be selected from the group consisting of air, oxygen, nitrogen, carbon monoxide and dioxide, argon and any inert gases not effecting the polymer matrix.

In a preferred form, the extruded thermoplastic composition comprises thermoset reclaimed rubber particles and a thermoplastic binder such as polyethylene for the particles. The composition is extruded through a heated die from about 350° to 365° F. to melt the polyethylene binder and form a pipe-preform in a very softened state. Gas is preferably injected through the center of the heated die and into the pipe-preform under a positive pressure of about ½7 to about 3 psi and temperature to hold the pipe-preform in a substantially constant size and shape during the extrusion. Cooling the pipe-preform, preferably at temperatures below 200° F., while maintaining the positive gas pressure, solidifies the thermoplastic composition thereby creating a thin skin over the pipe within approximately 10 feet of cooling in a liquid or water bath approximately 48° to 52° F., and maintains a fluid permeable wall of the pipe-preform thereby producing a porous pipe of substantially uniform porosity throughout the wall thickness along its length. The thermoplastic binder is a polyolefin or copolymer thereof, most preferably a linear low density polyethylene. Before mixing and introducing the composition into the extruder apparatus, the rubber particles have a mesh size of about 60 to 140, preferably about 80 to 100 mesh to obtain the desired advantages of this invention.

Additionally, the process of the present invention utilizes components which have an extremely low moisture content and are extruded from an unvented single screw extruder. The extruder temperature, especially at the extruder die, the blending process for the composition components, the gas injection pressure and the pull-off or stretching rate are all precisely controlled to produce a porous pipe having uniform porosity and a uniform leak rate throughout lengthy runs of the pipe over a broad range of fluid pressures. The pipe issuing from the extruder is slowly cooled in a lengthy liquid or water bath, the uniform porosity being obtained by the non-homogeneity of the composition mixture, the composition being essentially moisture-free and the amount of positive gas pressure being injected through the heated die into the softened pipe-preform as it exits the mandrel. Since it is known that rather small changes in the pull-off or stretching rate produce large changes in the porosity, micropore dimension and leak rate of the pipe, the extrusion of the pipe and the pull-off and stretch through the liquid bath are maintained constant for optimum results. The temperature control of the extrusion die and the speed of the extrusion and puller are controlled by electronic controllers to provide the precise and stable conditions required.

The use of the non-vented extruder is preferred since the water content of the extrudate is maintained extremely low and no need exists to vent excess vapor pressure. With the moisture content of the extrudable mixture being controlled to less than about 0.15% by weight water, porosity in the pipe can be controlled and is not dependent on water vapor producing small apertures or pores in the pipe walls. In view of the other elements of the process being precisely controlled, vapor pressure does not influence pore formation, but the non-homogeneity of the intimate mixture based on two major constituents is a most significant factor. Porosity of a given run of pipe as manufactured in accordance with the present invention has shown a variation of fluid delivery of less than about 5%. Thus, the porous pipe can be efficiently made having highly uniform porosity of greater than 90% along the hose through the desired range of size and strength limitations for its use in a wide range of aeration applications. The uniformity of the pores permit very lengthy runs of pipe to be employed in a wide variety of application uses. Porous pipe has been produced having a much more uniform and regular pore structure primarily due to the improved control of the materials in the dual-component system without the addition of slip agents or lubricants.

DETAILED DESCRIPTION OF THE INVENTION

The extrudable mixture of the present invention comprises a major portion of thermoset polymer particles and a minor portion of a low density polyolefin as a binder such as linear low density polyethylene. No further constituents are required; however, in some cases it may be desirable to include extremely small amounts of slip agents or lubricants depending upon process parameters. Examples of suitable thermoset polymer particles include cured or sulfur-crosslinked natural or synthetic rubber. Cured crumb rubber reclaimed from the tread portions of vehicular tires is a most readily available and inexpensive constituent. The tread portion is known to comprise the better quality rubber of such tires, much more so than the side walls or casings. The rubber is ground into crumb-like particles which have a mesh size of about 60 to about 140 mesh, preferably about 80 (0.00825 inch) to about 100 mesh.

The binder component is a thermoplastic material such as linear low density polyethylene resin capable of thermal softening below about 300° F. while the extruder die operates at a temperature ranging from about 350° to 365° F. Such resin is inert to the other component of the pipe, i.e., the cured rubber, and forms a non-ho-mogenous mixture therewith under the prevailing conditions of thermal extrusion. Other binders may be substituted for the polyethylene; however this material is preferred since it is unreactive in soil environment in long term use and to various chemicals and fertilizers which may be dispensed through the pipe along with fluid. Low density polyethylene are known to have a density ranging from about 0.90 to 0.93 gram/cubic centimeter, and porous pipe made with such binder resin is very flexible and can be easily bent to desired configurations and contours. The polyethylene is usually employed in the form of granules or particles also having a fineness of about 10 to 30 mesh.

Both the crumb rubber and polyethylene binder are thoroughly dried prior to their introduction into the extruder. The total moisture content of each component and the mixture is maintained at a level below about 0.15% by weight water prior to their combined use. Such low water content is critical to the development of small uniform pores in the pipe during and after extrusion. The non-homogeneity of the mixture and the proportions of the two components serves to create uniform porosity in the pipe wall. The mixture consists of about 70% to 90% by weight crumb rubber particles and about 10% to 30% by weight polyethylene, preferably linear low density polyethylene, the preferred ratio being about 80% to 20% by weight.

Figure 1:
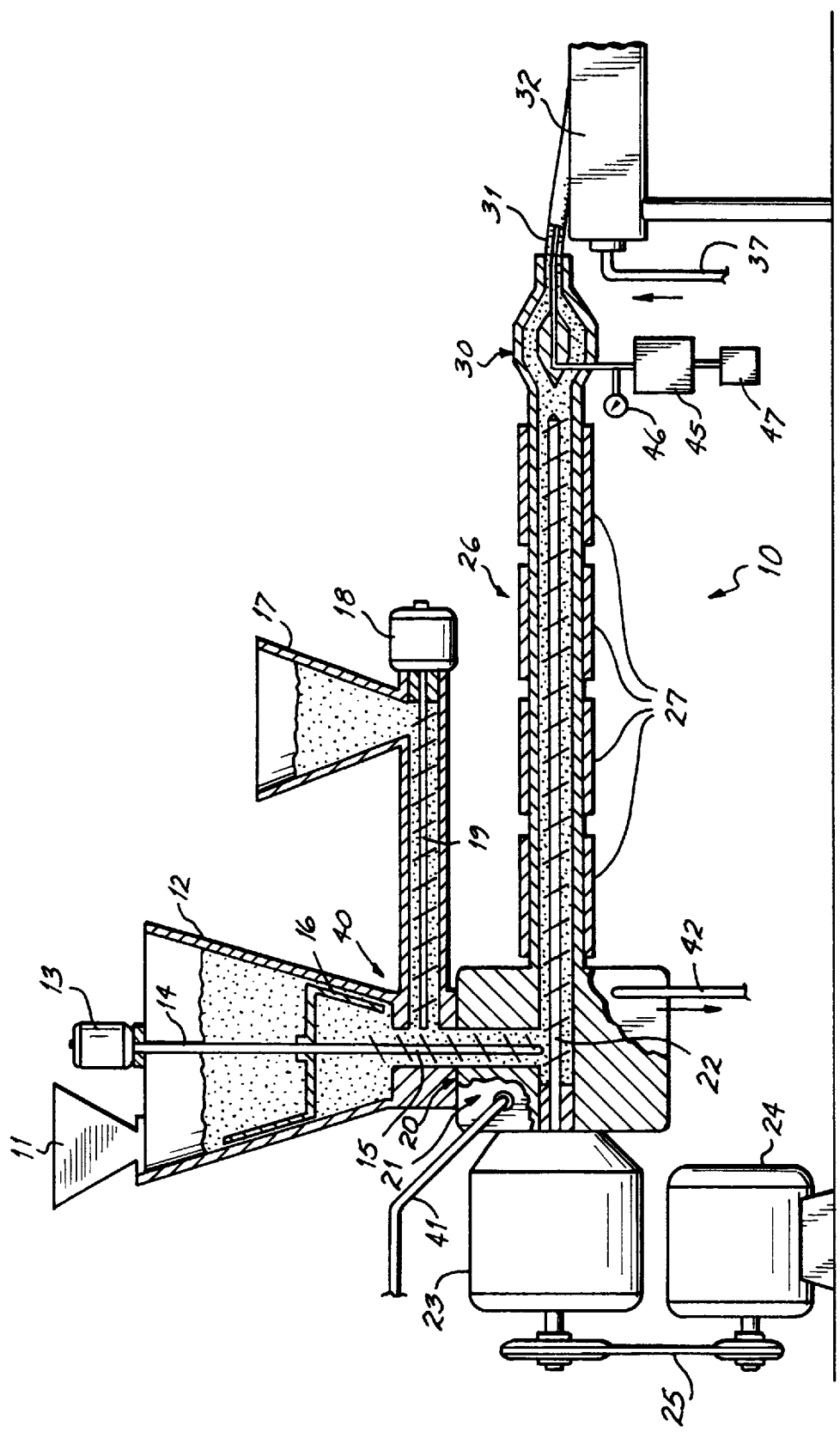
FIG. 1 is a schematic view of one system for making aeration pipe in accordance with the invention.

The mixture is either combined and intimately mixed prior to its introduction into the extruder or delivered to the extruder through separate component hoppers affixed thereto as shown in FIG. 1. The mixture is further mixed and heated within the extruder and passed therethrough by a single-screw having a continuous spiral flight. The mixture is melted together, the binder being thermally softened and the crumb rubber particles remaining as discrete individual unmelted irregularly-shaped crumb particles. The particles are coated by the binder during the mixing and agitation action of the extruder apparatus, the lack of moisture assisting in the coating action.

Referring to FIG. 1 of the drawings, one form of an extrusion apparatus 10 suitable for use in the method of this invention consists of a conventional flight extruder which is unvented due to the inherently dry condition of the extrudable materials. A preferred example is a conventional 3.5 inch, 24 to 1 ratio of length to diameter extruder, which is both non-vented and air-cooled. A drier chamber 11 is provided to fully dry the crumb rubber particles prior to mixing. A crammer hopper 12 is mounted on the upper region of the extruder, an electric motor 13 being employed to drive the feeding element in the crammer hopper 12. A crammer drive arm 14 is used to operate to drive crammer screw 15 to deliver the dried crumb rubber particles into the extruder. Crammer wiper arms 16 serve to wipe the hopper inner walls for smooth delivery of the crumb rubber.

A second feeder hopper 17 is provided to contain the binder material, i.e., linear low density polyethylene resin, which is mounted on an upper region of the extruder. A second electric motor 18 is used to drive a feeder screw 19 to deliver the binder into the extruder. The several dried materials are introduced into a feed throat 20 which is water-cooled and then into extruder 21. The extruder has a gear-driven mixing screw 22 which is driven by a gear box 23 having a reduction ratio of about 17.5 to 1. The gear box 23 is driven by a relatively large electric motor 24 through a connecting drive belt 25. The extruder barrel 26 extends horizontally and is provided with a carbide-hardened liner as is well known in the art. The barrel is provided with about 4 or 5 electrically-heated, air-cooled elements 27 spaced along the barrel which control the zonal heating of the extrudate in the barrel. An annular pipe mandrel or die 30 having about two annular heating elements mounted around the die is used to precisely control the die temperature and the newly formed porous pipe 31 extruding therefrom.

The pipe-preform 31 is delivered into a lengthy cooling trough 32 located closely adjacent to the pipe die 30. The pipe is supported by spaced-apart rollers mounted within the trough. The trough is quite lengthy extending preferably about 70 to 80 feet in a straight line and containing cooling water having a temperature of preferably about 48° to 52° F. The pipe sets up into its final form within the trough. Puller drive wheels (not shown) are mounted in vertical array to contact upper and lower surfaces of the pipe to pull the same through the trough. The lower drive wheel of the puller is driven by a puller motor to exert tension in the pipe for its uniform delivery to a winder for wrapping the pipe onto a spool. The electric motors which drive the extruder and puller respectively are preferably DC motors and are slaved together to obtain a very precise control over the pipe extrusion and pull-off rate at the same speed. Thus, the process is capable of producing a very uniform product having the desired porosity while maintaining an overall cost-effective efficiency.

To cool the pipe-preform, an inlet line 37 delivers chilled cooling water into the trough 32 and the warm water exits from the trough through an outlet line (not shown). A temperature controller connected to a flow meter is used to maintain a uniform water temperature in the cooling trough. Also, the so-called additive head 40 of the extruder is maintained at a constant temperature by cooling water introduced therein through inlet line 41 and outlet line 42. Thus, the extrudate is introduced into the extruder at a precisely controlled temperature.

The annular extruder mandrel or die 30 may be maintained at a temperature ranging from about 270° to 290° F., however, the preferred range of temperature is about 350° to 365° F. for rubber particles and linear low density polyethylene binder. The porous pipe may be formed in a variety of sizes depending on its intended use, however a preferred range of sizes ranges from about 0.375 to 1.0 inch internal diameter with a wall thickness of about 0.10 inch. The porous pipe exhibits an extremely uniform porosity of less than about 5% fluid delivery variation whether a liquid or a gas is emitted from the porous pipe. The uniformity of the pores permit very lengthy runs of pipe to be employed in a wide variety of application uses.

Figure 2:
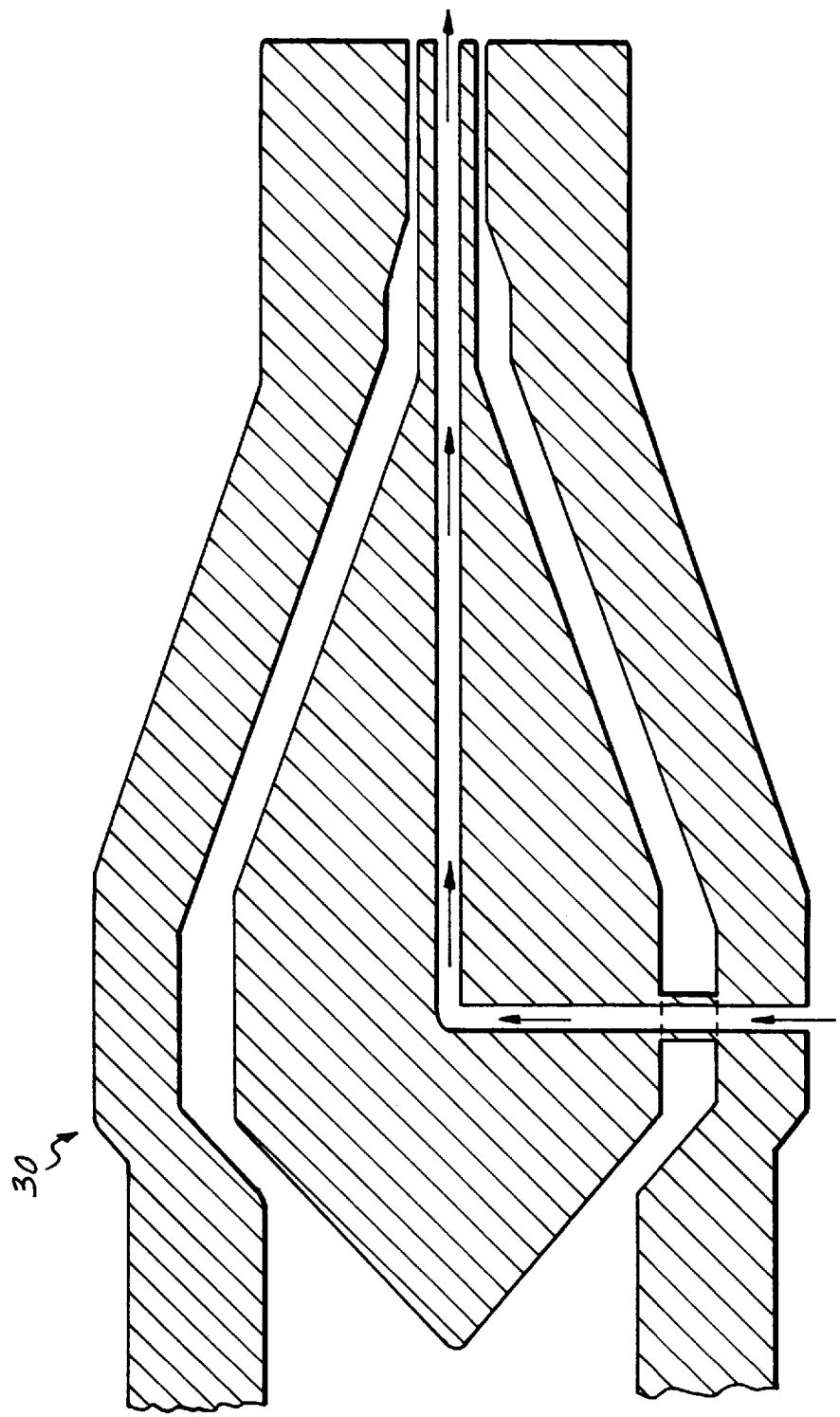
FIG. 2 is an enlarged cross-sectional view of a mandrel of an extruding apparatus of FIG. 1 illustrating the flow path of gas therethrough.

Referring to FIG. 2, during extrusion of a plastic composition of thermoset polymer particles and a thermoplastic binder for the particles through die 30 to form a softened pipe-preform, gas is injected through die 30 under positive pressure into the inside of the softened pipe-preform. A pressure regulator 45 and a pressure gauge 46, both shown in FIG. 1, are utilized to control the amount of air pressure injected from a pressurized supply source 47 depending on the porosity and the type of porous hose desired. To manufacture a hose with micropores for aeration about 60 to 140 mesh particle sizes are required for the thermoset polymer component and a positive gas pressure of about $\frac{1}{27}$ to about 3 psi during extrusion of the pipe-preform. Preferably, the gas is air although other inert gases may be used, such as oxygen, nitrogen, carbon monoxide and dioxide, argon and any inert gases not effecting the polymer matrix. Further, the air is injected through the center of the mandrel or die that forms the hole or lumen of the pipe. This permits a uniform pressure on the entire inside of the pipe-preform wall as it exits the extruder and is cooled. By injecting at a very low pressure, a more consistent size in the pipe may be maintained. Keeping a consistent size and shape for the pipe provides consistency in the diffusion rate and porosity over a long length of porous pipe. Gas is preferably injected through the center of the heated die 30 and into the pipe-preform under a positive pressure of about $\frac{1}{27}$ to about 3 psi for rubber particle mesh sizes of about 80 to 100 and temperature to hold the pipe-preform in a substantially constant size and shape during the extrusion and cooling of the pipe-preform.

Figure 3:
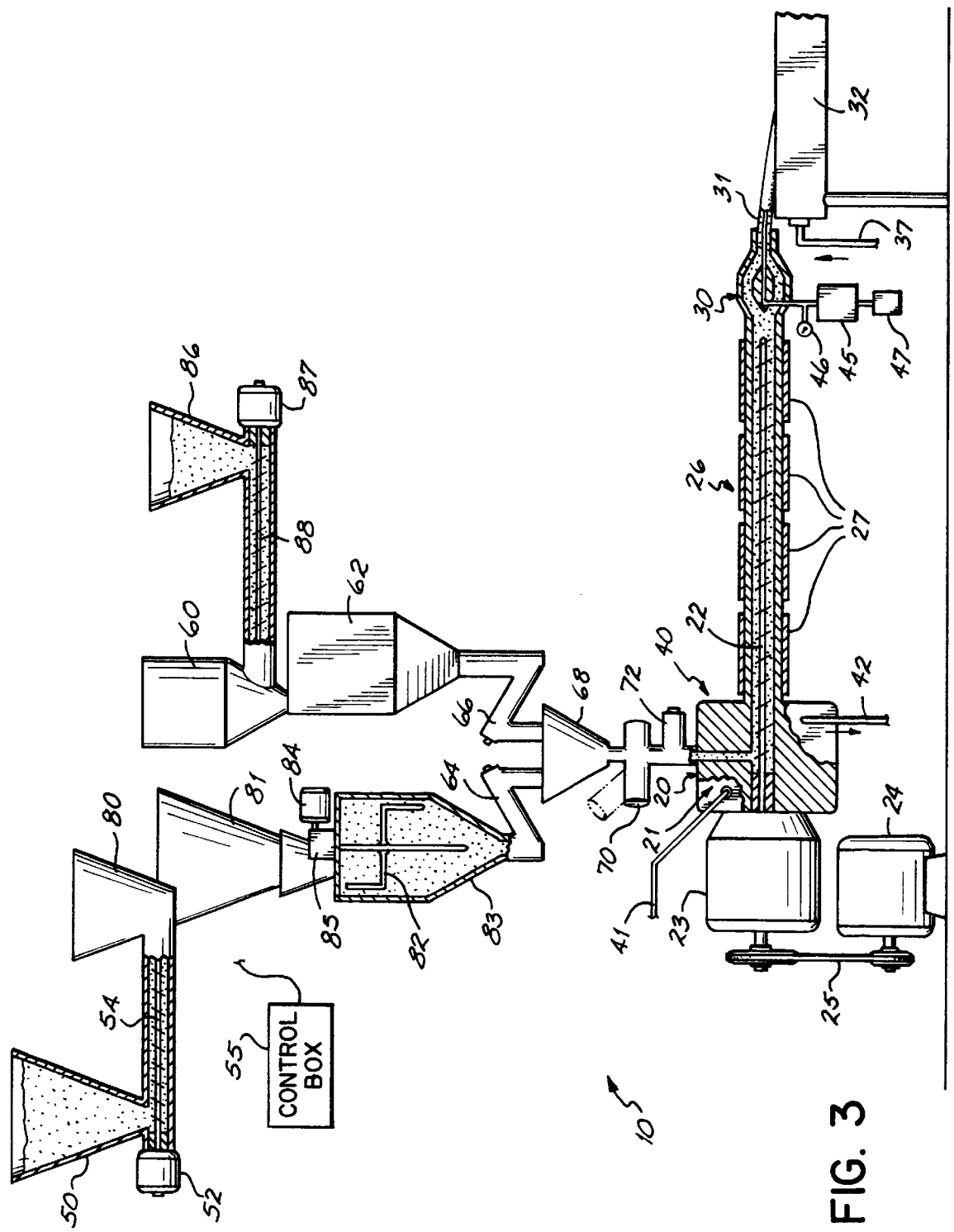
FIG. 3 is a schematic view of another system for gas injection, extrusion and cooling porous pipe in accordance with the invention.

Another system for gas injection, extruding and cooling porous pipe is shown in FIG. 3. Electrical control box 55 controls all of the vacuum loading in accordance with the invention. For example, control box 55 controls the level sensors that informs the extruder system and apparatus when to call for material, whether the material is thermoplastic binder or crumb rubber particles. The rubber particles are vacuum loaded from a vertical blender 50. The vertical blender 50 may be used to further break up the crumb rubber and homogenize the particles where the rubber particles are from reclaimed product and are not exactly identical samples. Blender 50 permits a large amount of rubber, upwards of 1250 pounds, to be blended and mixed prior to introduction of the thermoplastic binder component. The extrusion apparatus 10' consists of a conventional flight extruder which is unvented due to the inherently dry condition of the extrudable materials. A preferred example is a conventional 3.5 inch, 24 to 1 ratio of length to diameter extruder, which is both non-vented and air-cooled.

Preferably, a drier chamber 80 is provided to fully dry the crumb rubber particles prior to mixing. The crumb rubber may be received from blender 50 by conventional methods, i.e., an electric motor 52 and a drive screw 54. Vacuum loading hoppers 81 and 60 are mounted on the upper region of the extruder apparatus to initially receive the rubber crumb and polyethylene binder from blender 50 and binder feeder hopper or silo 86. Vacuum loader 81 loads the rubber crumb particles that have been mixed and substantially homogenized in blender 50 for smooth delivery of the crumb rubber. Feeder silo 86 is provided to contain the binder material, i.e., linear low density polyethylene resin, which can be mounted on an upper region of the extruder or may be located in a position for easy loading. An electric motor 87 may used to drive a feeder screw 88 to deliver the polyethylene binder from silo 86 to vacuum loader 60.

Below vacuum loaders 81 and 60 are separate chambers 83 and 62 which receive the rubber particles and polyethylene binder. Chamber 83 receives the rubber crumb particles and has an agitator 82 inside the chamber that is operated by a motor 84 and gear box 85 that is located on top of the chamber. The agitator keeps the rubber from settling out or bridging over. Rubber, in general, whatever the mesh or particle size, is fairly hard to move in a uniform manner. However, constant agitation allows the rubber particles to fall in a more uniform manner. Chamber 62 receives the thermoplastic polyethylene binder and because polyethylene flows rather easily, this hopper is adequate to handle the material.

Volumetric metering augers 64 and 66 lie underneath the chambers retaining the polyethylene and crumb rubber particles. Preferably, these metering augers are operated by DC drive motors and are small enough not to pose an obstruction to the overall apparatus. Additionally, augers 64 and 66 are variable speed augers that take polyethylene out of chamber 62 and rubber particles from underneath chamber 83 and deliver the product, i.e., the rubber and polyethylene blended together, into a mixing chamber 68 located underneath the augers. Again, control box 55 is controlling all of these functions automatically. It is keeping the proper amount of material in both chambers 83 and 62 by controlling the amount of product through metering augers 64 and 66. Further, these augers do not run at the same speed. They are proportional augers. If the process needs more material, control box 55 will speed the augers up or slow them down, whatever the need is proportionally, to achieve a consistent blend entering mixing chamber 68.

Underneath blending chamber 68 is a set-off blender 70. This blender helps to continue the blending operation and it blends the product even better so that a more consistent blend and, therefore, a more consistent gas diffusion in the aeration pipe is achieved. It is very important to have a consistent diffusion rate, especially in agricultural or commercial uses where quality and durability are necessitated.

Thereafter, the blended product drops into a rate auger 72. All of the augers, rate auger 72 and metering augers 64 and 66, are driven by DC drive motors. Thus, each of these contributes to the speed of the input of the blended materials into the extruder and may vary the speeds to achieve maximum efficiency. This also helps keep from overloading the extruder while maintaining a constant flow rate into extruder 21 to provide maximum production of the product out of the entire extruding apparatus.

The several dried and thoroughly blended materials are introduced into a feed throat 20 which is water-cooled and then into extruder 21. The details of the extruder 21, mixing screw 22, gear box 23, electric motor 24, drive belt 25, extruder barrel 26, air-cooled elements 27 and mandrel or die 30, and procedures of their operation for FIG. 3, are the same as those described above for FIG. 1.

Similarly, the pipe-preform 31, cooling trough 32, and their modes of operation are as described above. As in the method of FIGS. 1 and 2, during the extrusion process of FIG. 3 the plastic composition of thermoset polymer particles and a thermoplastic binder for the particles move through die 30 to form a softened pipe-preform, and air is injected through die 30 under positive pressure into the inside of the softened pipe-preform. Gas is preferably injected through the center of the heated die 30 and into the pipe-preform under a positive pressure of about 1/27 to about 3 psi for rubber particle mesh sizes of about 3 to about 120, and at a temperature to hold the pipe-preform in a substantially constant size and shape during the extrusion.

EXAMPLES: AERATION POROUS PIPE OF THIS INVENTION FOR COMPARISON WITH THREE COMMERCIAL DEVICES

The following data summarizes the oxygen transfer characteristics of a porous rubber pipe (5/8 inch) made by the method of this invention for comparison with three commercially available diffusion aerators. The commercially available diffusion aerators included a stone aeration bar, a stone, aeration dome, and a stone aeration cylinder. The porous aeration pipe of this invention was provided with a 5/8 inch inner diameter. The aeration pipe had a composition of 80% by weight 80 mesh reclaimed rubber particles and 20% by weight 10 to 30 mesh linear low density polyethylene (LLDPE). The porous pipe had at least a 90% uniform porosity across its length and micropores having an average diameter of about 0.0015 inch which is well within the broader range of about 0.001 to about 0.004 inch. It is to be understood that the "average diameter" is an approximation because the micropores of the pipe have a non-uniform cross-sectional pore size with irregular configurations due to the method of making. Furthermore, the following data conforms as nearly as possible under the test conditions to the ASCE Oxygen Transfer Standard as described in ASCE publication "A Standard for the Measurement of Oxygen Transfer in Clean Water", dated July, 1984.

A. The Purpose of the Tests

The purpose of these tests was to determine the aeration characteristics of the aeration pipe of this invention for comparison with the above-mentioned three diffusion aerators under the same test and air supply conditions so that their relative performance could be assessed. To facilitate comparisons, the same test set up was used for each aerator, and the oxygen characteristics were measured to calculate the Standard Oxygen Transfer Rate (SOTR), Standard Aeration Efficiency (SAE) and Standard Oxygen Transfer Efficiency (SOTE) for each aerator.

B. Test Site Description and Evaluation

The test site was a temperature controlled room, which was held at 20.5±1° C. during the experimental period. Water temperature during this time was slightly cooler, 19±1° C., as a result of a low level of evaporative cooling in this humid room. Room pressure, as measured by a mercury barometer, was atmospheric for the experimental period. Relative humidity in the room, as measured by a sling hygrometer, was 89±1% during the experimental period.

C. Aeration Devices, Placement and Operating Conditions

The aeration devices included a 4 foot diameter ring of the porous aeration pipe of this invention, namely 5/8 inch (ID); a 61 cm×6 cm diameter stone aeration cylinder; a 19 cm diameter by 2.5 cm tall composite stone aeration dome; and two 3.8 cm×3.8 cm ×15 cm aeration stones connected by a plastic T. Each of the aerators was centered in a fiberglass tank measuring 5 feet in diameter by 24 inches high (300 gallon). The aeration pipe was held down to within 1 inch of the bottom by four weights; the other diffusers required no weights. The tank was filled with 765 liters of water (18 inches of water depth). The aerators were each connected to a piece of thick-walled, non-porous tygon tubing which acted as an air supply line. The air supply came from a 1/4 horsepower Gast diaphragm pump that produced a gas flow of from 1.5 to 1.8 SCFM in each of the devices. The tubing was also connected via a Y connector and shutoff valve to a tank of compressed nitrogen for deoxygenation. Air delivery to the system was measured with a Cole-Parmer variable area rotameter (gas flow meter). Power utilization of the pump was based on its measured power consumption done with a three phase watt meter.

D. Source and Quality of the Water

The water used was municipal water, supplied through the drinking water lines, and filtered with an activated carbon filter. Thus the water qualifies as "clean" water.

E. Description of the Air Flow Measurement System

The air flow was measured with a Cole-Parmer direct reading variable area rotameter. The flow meter measures air flow between 0 and 4 SCCM. The flow meter was on a leveling base and had been kept clean to insure accuracy of the calibration values. Barometric pressure, system air flow, system pressure, room air, and water temperature were recorded.

F. Power Measurement Procedure

For this test, line power was determined from data supplied by the technical representatives of Gast Manufacturing Corp. The conversion of horse power to electric watts was derived from the CRC handbook.

G. Water Quality

Oxygen tension was rapidly reduced by bubbling the tank with nitrogen from a compressed gas tank. The water in the tank was equilibrated with nitrogen for approximately 1 to 2 hours, while the tank was covered with a plastic tarp. This reduced the water to >0.18 mg/lO$_2$.

The water temperature for each of the tests was 20±0.5° C. Since clean, charcoal filtered tap water was used, water chemistry was constant. No cobalt or sodium sulfite was used.

Water clarity was as expected for tap water, and no foaming or color change was noted in the test. Total dissolved solids in water typically ranges from 240 to 280 mg/l, total hardness and alkalinity are typically 80.

H. DO Measurements

The dissolved oxygen was measured with a YSI oxygen meter and Clark style polarographic electrode equipped with a stirrer to reduce flow sensitivity. The DO was measured as $P_{O2}$ (measured in mmHg). Since the $P_{O2}$, humidity, barometric pressure and water temperature were all measured, the values given can easily be converted to any convenient DO measurement. The electrode performance was cross calibrated against an electrode (Microelectrodes Inc.) in a thermostatically regulated cuvette. Agreement between the electrodes was with the range of measurement error (approximately 0.5 to 1% or 1 to 1.5 torr $P_{O2}$). Data is reported in mg/l to conform to most current American standards.

Figure 4:
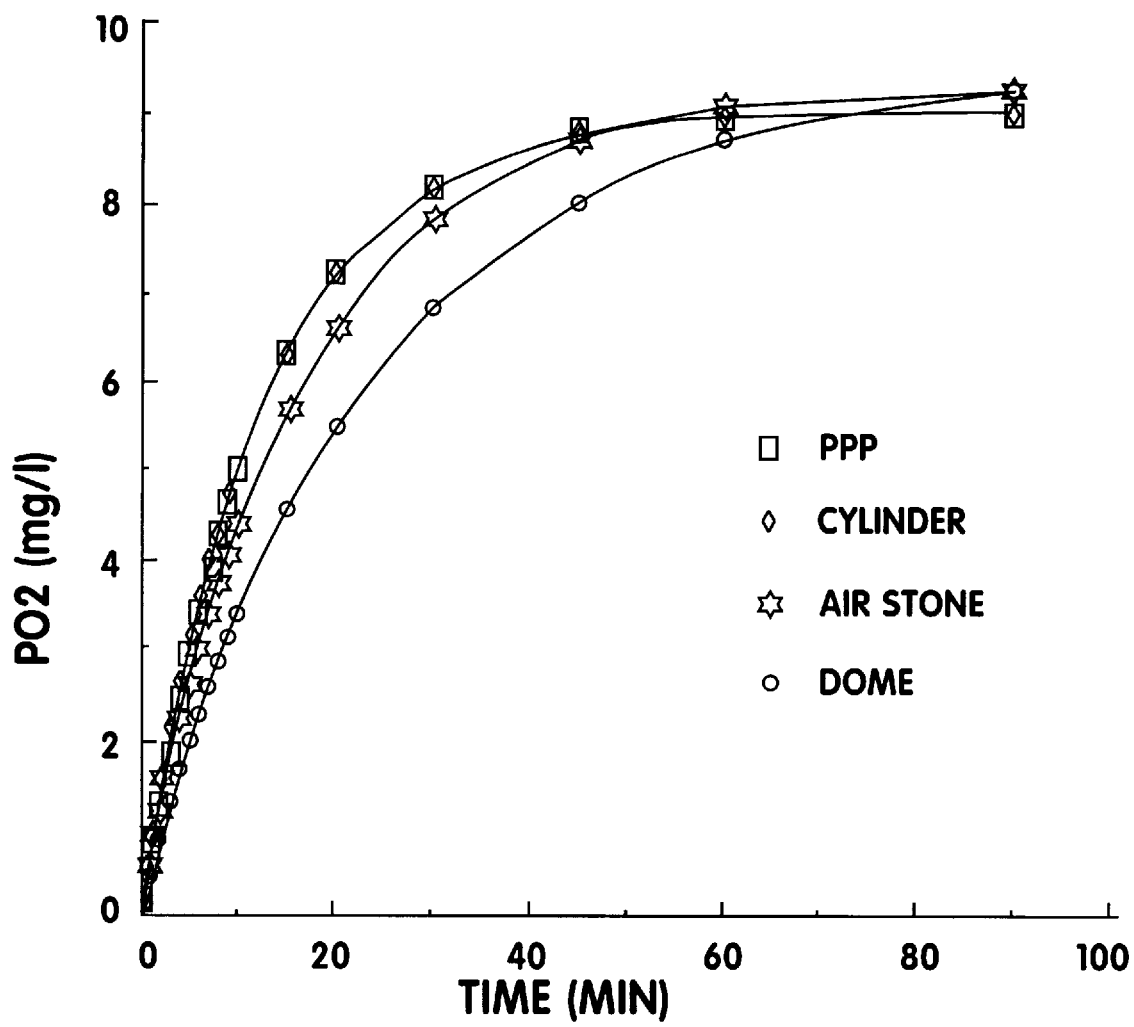
FIG. 4 shows the oxygenation characteristics for comparison of three diffusion aerators with the aerator of this invention.

The DO values were taken from 4 sites in the tank, as shown in FIG. 4. As there was no statistically significant variability between sites in this relatively small tank, further trials utilized only 1 site, and more frequent measurements were made than would have been possible of all 4 sites had been used.

I. Summary of Oxygen Transfer Measurements

A graphical summary of the average DO vs time for two trials on each of the four aerators is given in FIG. 3. A summary of the average values of kLa20, SOTR, SAE and SOTE for each of the four diffusers is given in Table 1, below. Water depth was 18 inches, power output (¼ hp), gas flows (1.5 to 1.8 SCFM) and water temperature (19±1.0° C.) for each trial are listed in Table 1.

TABLE 1

|  | SOTR | SAE | SOTE | kLa20 (min-1) | Air Flow (cfm) |
| --- | --- | --- | --- | --- | --- |
| PPP | 559.25 | 2.57 | 0.046 | 0.085 | 1.5 |
| Cylinder | 555.01 | 2.38 | 0.038 | 0.078 | 1.8 |
| Air Stone | 464.01 | 1.99 | 0.036 | 0.066 | 1.6 |
| Dome | 326.68 | 1.40 | 0.027 | 0.046 | 1.5 |

J. Values and Correction Factors Used

The calculations of SOTR, SAE, kLa20, Cx20, and SOTR were as described in the ASCE guidelines and were carried out on a computer spreadsheet program. Briefly, Cx20 was calculated as Cx * (I/Temp. Correction * Pressure Correction factors). kLa20 was calculated as kLa * theta$^{(20-T)}$, where theta was taken as 1.024. SOTR was calculated as the kLa20i * Cx20i * V where V was the volume of water in the test tank (765 I). The SAE was calculated as the ratio of the SOTR/Power Input in Mg O$_2$/watt min (i.e., simply as the ratio of SOTR/watts). The SOTE was calculated as the SOTR/0.23YpQs where Y, the mole fraction of dry gas delivered was 0.96, p, the density of dry air is 1293 mg/I at STP, and Qs, the gas flow rate, was 3 SCFM (converted into I/min). Since this result is a fractional result, the calculation is presented as the % of O$_2$ transferred from the gas stream to the tank as DO.

K. Comparative Assessment of the Diffusion Aerators

There were noticeable differences in the four diffusion aerators used in this test. While all were supplied with air from the same pump, they did not all have the same air flow characteristics. The highest air flow rate was obtained from the cylinder aerator. This indicates that it had the least resistance and suggests that it would require the lowest air pressure to operate. The dome and porous pipe aerators had slightly lower air flow rates, indicating that they had slightly greater air flow resistance and would require slightly higher pressures to operate. There were additional differences in the geometry of each of the diffusers. The porous pipe and air cylinder had the greatest surface areas, while the dome and air stones had much smaller areas. A number of methods could be used to standardize (i.e., cost, linear length, surface area, etc.) for the test, but, based on the results (with the exception of the dome), we would expect little overall difference given that close to the same air flow was injected through each system.

The porous pipe product of this invention produced the best air efficiency results, but these results were probably not significantly different than those of the air cylinder, and even the air stone did reasonably well. However, when considering a diffusion aerator, the main concerns, aside from aeration efficiency, are operating pressure, cost, ease of installation, maintenance, and replacement. Based on these important considerations the porous pipe has the advantage of low cost, light weight, flexibility and durability compared to the more brittle and expensive stone diffusers tested.

It should be understood that the embodiments of the present invention shown and described in the specification are only preferred embodiments of the inventor who is skilled in the art and are not limiting in any way. Therefore, various changes, modifications or alterations to these embodiments may be made or resorted to without departing from the spirit of the invention and the scope of the following claims.

What is claimed is:

1. A porous plastic pipe for improved diffusion of gas into a medium comprising:

a porous plastic pipe having a gas permeable wall of thermoset polymer particles and thermoplastic binder in a minor amount thereby bonding said polymer particles and creating a substantially uniform porosity through the pipe wall along the length of the pipe, said porosity provided by a plurality of micropores having an average diameter of about 0.001 inch to about 0.004 inch along the length of said pipe for diffusion of gas therethrough and transfer to a medium, said thermoset polymer particles having a mesh size of about 60 to about 140 mesh.

2. The pipe of claim 1 wherein said mesh size is about 80 to 100 mesh.

3. The pipe of claim 1 wherein said micropores are irregularly sized and range from about 0.001 inch to about 0.004 inch in cross-sectional dimension.

4. The pipe of claim 1 wherein said permeable wall has a substantially uniform porosity throughout the wall thickness of said pipe.

5. The pipe of claim 4 wherein said permeable wall has greater than 90% uniform porosity along the length of said pipe.

6. The pipe of claim 1 wherein said pipe comprises approximately 70% to 90% by weight rubber particles and approximately 10% to 30% by weight thermoplastic binder.

7. The pipe of claim 6 wherein said pipe preferably comprises approximately 80% by weight rubber particles and 20% by weight thermoplastic binder.

8. The pipe of claim 6 wherein said thermoplastic binder is polyethylene.

9. The pipe of claim 8 wherein said polyethylene binder is linear low density polyethylene.

10. The pipe of claim 1 for the diffusion of gas selected from the group consisting of air, oxygen, nitrogen, carbon monoxide and dioxide, argon and any inert gases not effecting the pipe matrix.

11. A method of making a porous plastic pipe for improved diffusion of gas into a medium comprising:

volumetrically delivering a major amount of thermoset polymer particles having a mesh size of about 60 to about 140 mesh and a minor amount of thermoplastic binder particles for said polymer particles to a mixing hopper for preblending thereof prior to extrusion, preblending said polymer particles and binder particles in said hopper, volumetrically feeding from said hopper said preblended polymer particles and binder particles at a volumetric feed rate for controlled discharge into an extruder, and extruding said preblended polymer particles and binder particles at an extrusion rate and temperature to melt the binder particles and bind the polymer particles therewith to produce a gas diffusion porous plastic pipe, controlling the volumetric feed rate and the extrusion rate to achieve improved extrusion efficiency and quality of said porous plastic pipe.

12. The method of claim 11 further comprising, prior to volumetrically delivering said polymer particles and binder particles to said mixing hopper, separately loading each of said polymer and binder particles into a plurality of separate feeding chambers and thereafter feeding said components for preblending.

13. The method of claim 12 wherein at least one of said chambers has an agitator for mixing said particles in said chamber.

14. The method of claim 12 wherein each of said polymer particles and binder particles is vacuum loaded into said chambers.

15. The method of claim 11 wherein volumetric metering augers with variable speed drives are used for volumetrically delivering each of said polymer particles and binder particles.

16. The method of claim 11 wherein volumetric metering takeaway augers with variable speed drives are used for controlled discharge of said polymer particles and binder particles to provide a substantially uniform porosity along the length of said pipe.

17. A method of making a porous plastic pipe for improved diffusion of gas into a medium comprising:

loading rubber particles having a mesh size of about 60 to about 140 mesh and polyethylene binder particles for said rubber particles into separate feeding chambers for forming a porous plastic pipe, volumetrically delivering by volumetric metering augers with variable speed drives each of said rubber particles in a major amount and a minor amount of polyethylene binder particles from said chambers into a mixing hopper for preblending prior to extrusion, preblending said rubber particles and polyethylene binder particles in said hopper, volumetrically feeding by a volumetric metering takeaway auger with a variable speed drive said preblended rubber particles and polyethylene binder particles for controlled discharge into an extruder, and extruding said preblended rubber particles and polyethylene binder particles to produce said porous pipe having a substantially uniform porosity through the pipe wall along the length of the pipe, said porosity provided by a plurality of micropores through the wall having an average diameter of about 0.001 inch to about 0.004 inch.

* * * * *